United States Patent
Allen

[11] Patent Number: 5,904,437
[45] Date of Patent: May 18, 1999

[54] CONNECTOR FOR SQUARE OR RECTANGULAR STRUCTURAL TUBING

[76] Inventor: Stuart Vernon Allen, 7233 Hanna St., Gilroy, Calif. 95020

[21] Appl. No.: 08/891,256

[22] Filed: Jul. 10, 1997

[51] Int. Cl.$^6$ .................................................. F16B 2/04
[52] U.S. Cl. ......................... 403/170; 403/171; 403/217; 403/297
[58] Field of Search ..................... 403/217, 218, 403/219, 170, 171, 172, 174, 176, 45, 297; 52/655.1; 74/89.14

[56] References Cited

U.S. PATENT DOCUMENTS

| | | | |
|---|---|---|---|
| 3,313,199 | 4/1967 | Houvener et al. | 403/297 X |
| 3,701,553 | 10/1972 | Vogt | 403/217 X |
| 3,901,613 | 8/1975 | Andersson | 403/171 X |
| 5,190,392 | 3/1993 | Parma et al. | 403/176 X |
| 5,310,273 | 5/1994 | Hara | 403/217 X |
| 5,556,218 | 9/1996 | Homer | 403/171 X |
| 5,605,410 | 2/1997 | Pantev | 403/176 X |

FOREIGN PATENT DOCUMENTS

| | | | |
|---|---|---|---|
| 2292145 | 6/1976 | France | 403/297 |
| 438848 | 12/1967 | Switzerland | 403/171 |
| 441871 | 1/1968 | Switzerland | 403/174 |

*Primary Examiner*—Harry C. Kim

[57] ABSTRACT

A connector for square or rectangular tubing. The connector consists of a cubic or otherwise appropriately shaped block with projecting sections in each direction where tubing is intended to be connected. The projecting sections fit loosely inside the tubing. Each projection has an internal cam that is rotated in place to drive radial pins outward to engage the inner surface of the tubing. Cam rotation is accomplished by screw means that are mounted transverse to the axis of the tube and engage the cam tangentially. In some embodiments, additional screw means engage the cam to cause contrary rotation to disassemble the connection.

11 Claims, 5 Drawing Sheets

CONNECTOR FOR SQUARE OR RECTANGULAR STRUCTURAL TUBING

FIELD OF THE INVENTION

This invention relates generally to connectors for square or rectangular tubing and specifically to connectors that may be inserted loosely into unmodified tubing, mechanically tightened to form a rigid, precisely aligned joint, and then mechanically disassembled to allow modification or reuse of the connector and/or tubing.

DESCRIPTION OF THE PRIOR ART

Commercially available structural framing systems fall into three categories. The first category is welded frames where inexpensive, standardized structural materials, including square and rectangular structural tubing, are machined, aligned, and permanently welded into the desired shape. Welded frames have great strength, can be accurately arranged into virtually any imaginable shape, and have low material costs. However, the specialized labor and equipment required to fabricate the frames is expensive, and, once welded the frames are difficult to modify and are not generally considered reusable.

A second type of structural framing system consists of custom extruded aluminum or rolled steel beams and a wide variety of connecting brackets, hardware, and accessories. The beams include features to allow easy attachment and are easily assembled and disassembled for reuse. However, strength is limited and the custom beams are expensive relative to the standardized structural shapes typically used in the welded frames described above. Extruded framing systems can also be difficult to align accurately when frame members are slideably attached to another member.

The third category of framing system is exemplified by U.S. Pat. No. 5,556,218 by Homer, September 1996. The system consists of connectors that are designed to be used with standard square and rectangular structural tubing. The connectors have projections that fit inside the tubing. Each projection has a wedge block and a screw that is used to pull the wedge block against an inclined surface, forcing the wedge surface to deform outward to engage the inside of tubing and lock the tubing in place. Wedge block framing systems have joints that can be as strong as welded frames, are easily assembled or disassembled, and use inexpensive standardized structural tubing. Prior art wedge block tubing connectors have limited ability to accomodate the wide dimensional tolerances of standard commercial structural tubing. Because of the limited expansion capability of a wedge system, a given connector is only useable for a small portion of the wide range of tubing wall thicknesses that are commercially available. A single wedge block per connector projection provides limited angular alignment stiffness. And, finally, prior art wedge block connectors retain the structural tubing by friction alone and may therefore have limited reliability when used for frames that are exposed to vibration or extremes of temperature.

SUMMARY OF THE PRESENT INVENTION

It is an object of the present invention to provide a connector for use in structural framing with standard commercial square or rectangular tubing that allows easy assembly or disassembly of the frame with standard tools, and that has strength comparable to that of the tubing.

It is a further object of the present invention to provide a structural tubing connector that provides accurate linear and angular alignment of the tubing.

Another object of the present invention is to provide a connector that is usable with a wide range of tubing wall thicknesses.

Still another object of the invention is to provide a connector that secures the tubing by deforming the interior surface of the tubing to provide a joint that is resistant to loosening by vibration or by extremes of temperature.

These and other objects are achieved according to the present invention which consists of a structural tubing connector having a central block with exterior dimensions matching the exterior dimensions of the tubing and with some faces oriented perpendicular to the desired directions of the tubing to be connected. Each of the faces to which tubing is to be connected has a projection along the axis of the tubing. Each of the projections has two sections, a section adjacent to the central block with exterior dimensions matching those of the tubing and another, usually longer, distal section with exterior dimensions that allow it to fit loosely inside the tubing to be connected.

Both sections of the projection have a central circular bore containing a single cam means rotatably retained therein. The distal section also has radial holes containing pin means slideably retained therein. The pin means may either be separated along the axis of the tubing into two widely spaced transverse planes or may be single pins sufficiently elongated in the tubing longitudinal direction to provide angular restraint for the tubing. Each pin means may have a resilient means that acts to preload the pin in a direction parallel to the axis of the structural tubing and away from the central block of the connector. The section of the projection adjacent to the central block has one or more screw means transverse to the axis of the tubing and tangential to the cam means that acts to rotate the cam means in the central bore. The cam means in turn engages the radial pin means in the distal section and pushes the pin means radially outward to engage the tubing with sufficient force to deform the interior surface of the tubing.

The structural tubing is assembled to the connector by sliding the open end of the tubing over one of the projections until it engages the outer surface of the section of the projection adjacent to the central block. The screw means is then actuated to turn the cam, pushing the pins out to engage and partially penetrate the interior surface of the tubing. The connector joint may be disassembled using the same or a different screw means to rotate the cam means in the opposite direction to release pressure on the pins and allow them to disengage the interior surface of the tubing.

As is apparent to one skilled in the art, the connector of the present invention may be made of many different materials appropriate to the tubing to be connected, may have many different numbers and orientations of projections for tubing connections, may have different numbers, shapes, or locations of pins, may have different shapes for the cam means, or may have different screw means to rotate the cam and still fall within the true scope and spirit of the invention.

BRIEF DESCRIPTION OF THE DRAWINGS

FIG. 1 is an isometric view of the preferred embodiment of a corner tee with cutaways showing the internal parts.

FIG. 2 is a section view of the preferred embodiment taken perpendicular to the tubing axis through the distal section of a connector projection showing the central cam and radial pins.

FIG. 3 is a section view of the preferred embodiment taken parallel to the tubing axis on a plane through two of the radial pins.

FIG. 4 is a section view of the preferred embodiment taken perpendicular to the axis of the tubing through the section of the connector projection adjacent to the central block.

FIG. 5 is a section view of a second embodiment taken perpendicular to the tubing axis through the distal section of a connector projection showing the central cam and radial pins.

FIG. 6 is a section view of a second embodiment taken parallel to the tubing axis on a plane through two of the radial pins.

FIG. 7 is a section view of a second embodiment taken perpendicular to the axis of the tubing through the section of the connector projection adjacent to the central block.

FIG. 8 is a section view of a third embodiment taken parallel to the tubing axis on a plane through two pairs of radial pins.

DESCRIPTION OF THE PREFERRED EMBODIMENT

Figure 1:
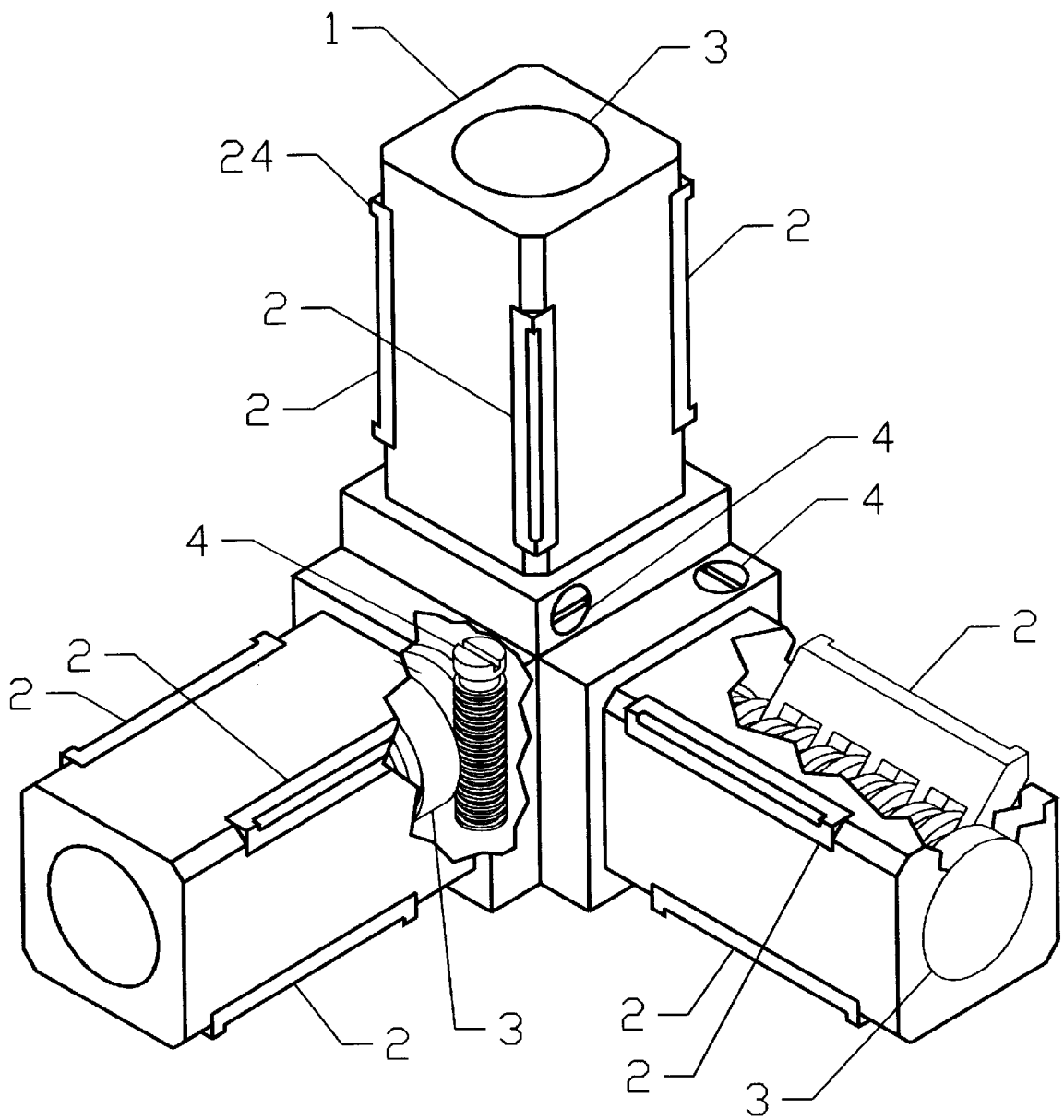
FIGS. 1 through 4 show the preferred embodiment of the invention.

FIGS. 1 through 4 show the preferred embodiment of the present invention. The invention is comprised of a connector body 1 with stepped projections in each direction where tubing is to be attached and, in each projection, four radial pins 2 slidably fitted into slots in the connector body, a cam 3 rotatably fitted into a bore in the connector body, two screws 4 rotatably and slidably fitted into a bore in the connector body, and in each radial pin, a resilient element 5.

Figure 2:
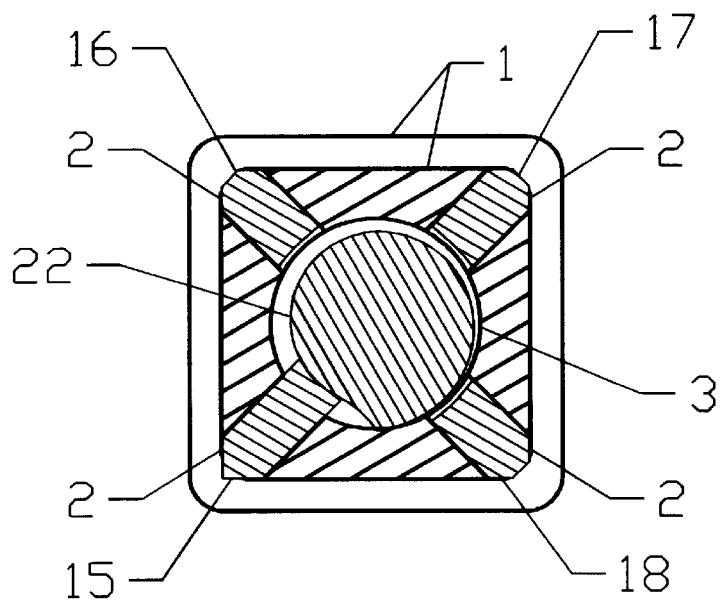
Figure 3:
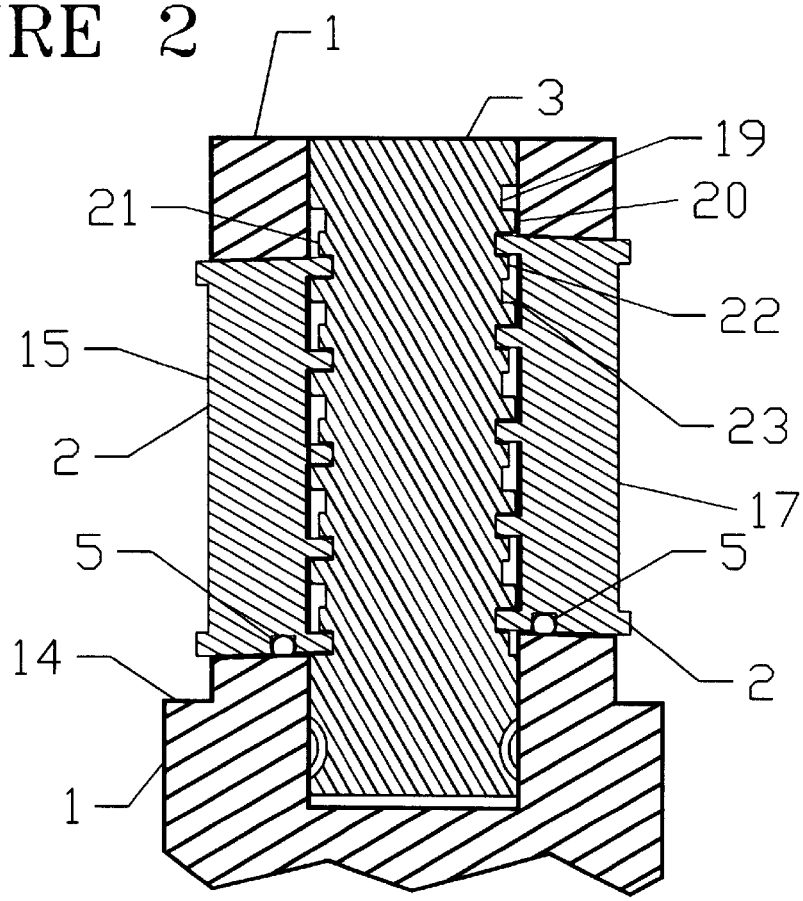
Figure 4:
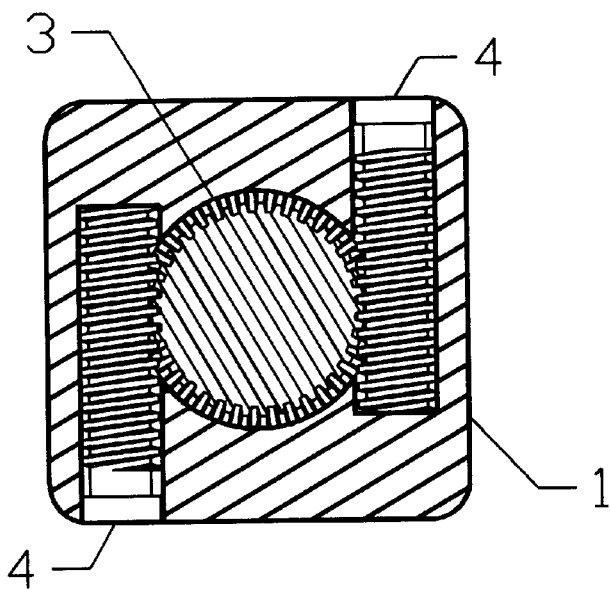

To assemble a frame joint, commercial square or rectangular tubing is fitted over the appropriate projection and pressed toward the center of the connector body 1 until it hits the step in the projection 14. Screws 4 are then turned and tightened alternately, causing the central cam 3 to rotate in a counterclockwise direction as shown in FIG. 2. The central cam 3 has a series of cam surfaces partially indicated by 19, 20, 21, 22, and 23 in FIG. 3. Adjacent cam surfaces sequentially engage different pins 2. Surface 19 engages pin 16, surface 20 engages pin 18, surface 21 engages pin 17, surface 22 engages pin 15, and surface 23 again engages pin 16. The sequence repeats until each pin has several points of engagement to the central cam. Each cam surface is shaped similarly to surface 22 shown in FIG. 2 but is rotated in 90 degree increments appropriate to the pin being engaged.

The pins 2 are forced outward by the rotation of cam 3 and toward the connector body central block by the slots in the connector body 1 to engage the inner surface of the square or rectangular tubing and seat it firmly against the step in the projection. Points on the pins 24 penetrate the tubing to increase the tensile strength of the joint.

Figure 5:
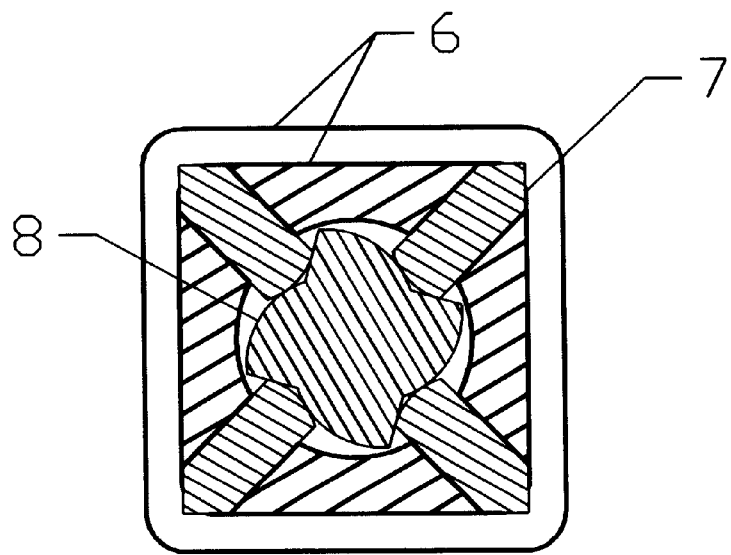
FIGS. 5 through 7 show a second embodiment.
Figure 6:
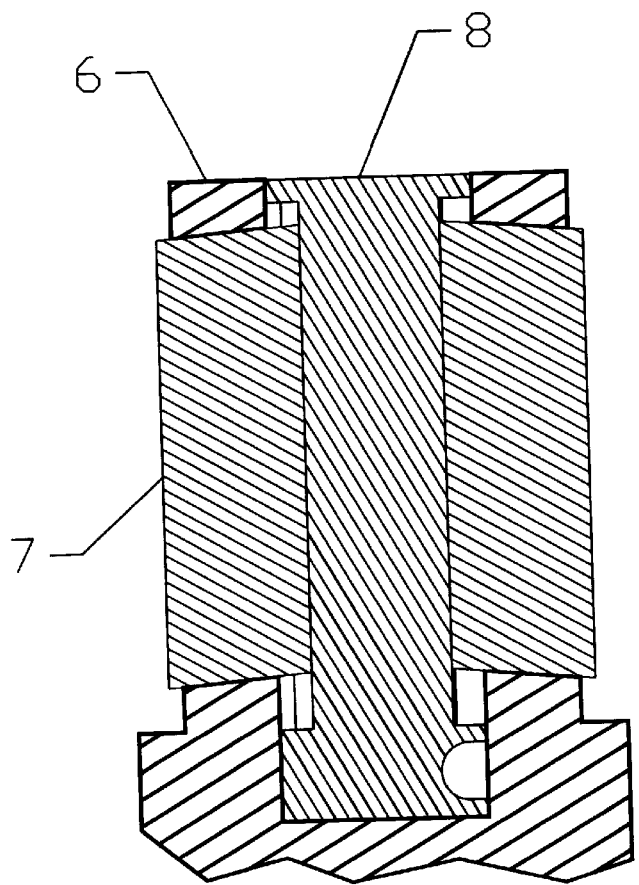
Figure 7:
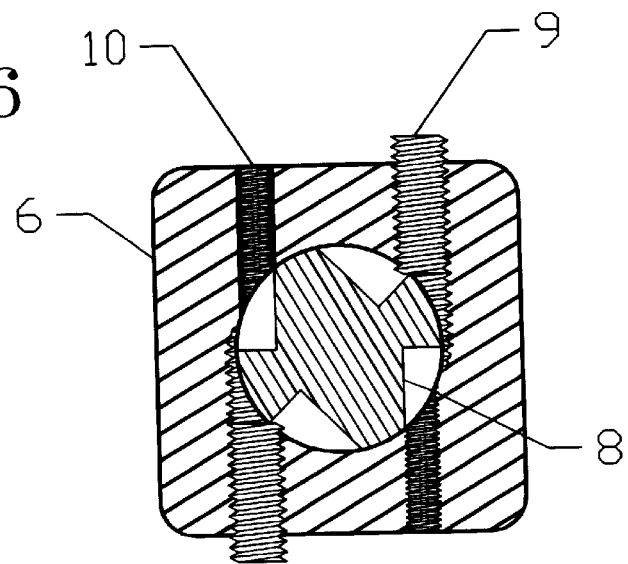

FIGS. 5 through 7 show another embodiment of the invention. This second embodiment consists of a connector body 6, radial pins 7, central cam 8, and set screws 9. The function of this second embodiment is similar to that of the preferred embodiment. Differences are in the shape of the central cam 8 shown in FIG. 5 and in the engagement of the set screws 9 that push directly on the cam 8 as shown in FIG. 7. The cam 8 has a single four-sided prismatic cam surface engaging all four pins.

Figure 8:
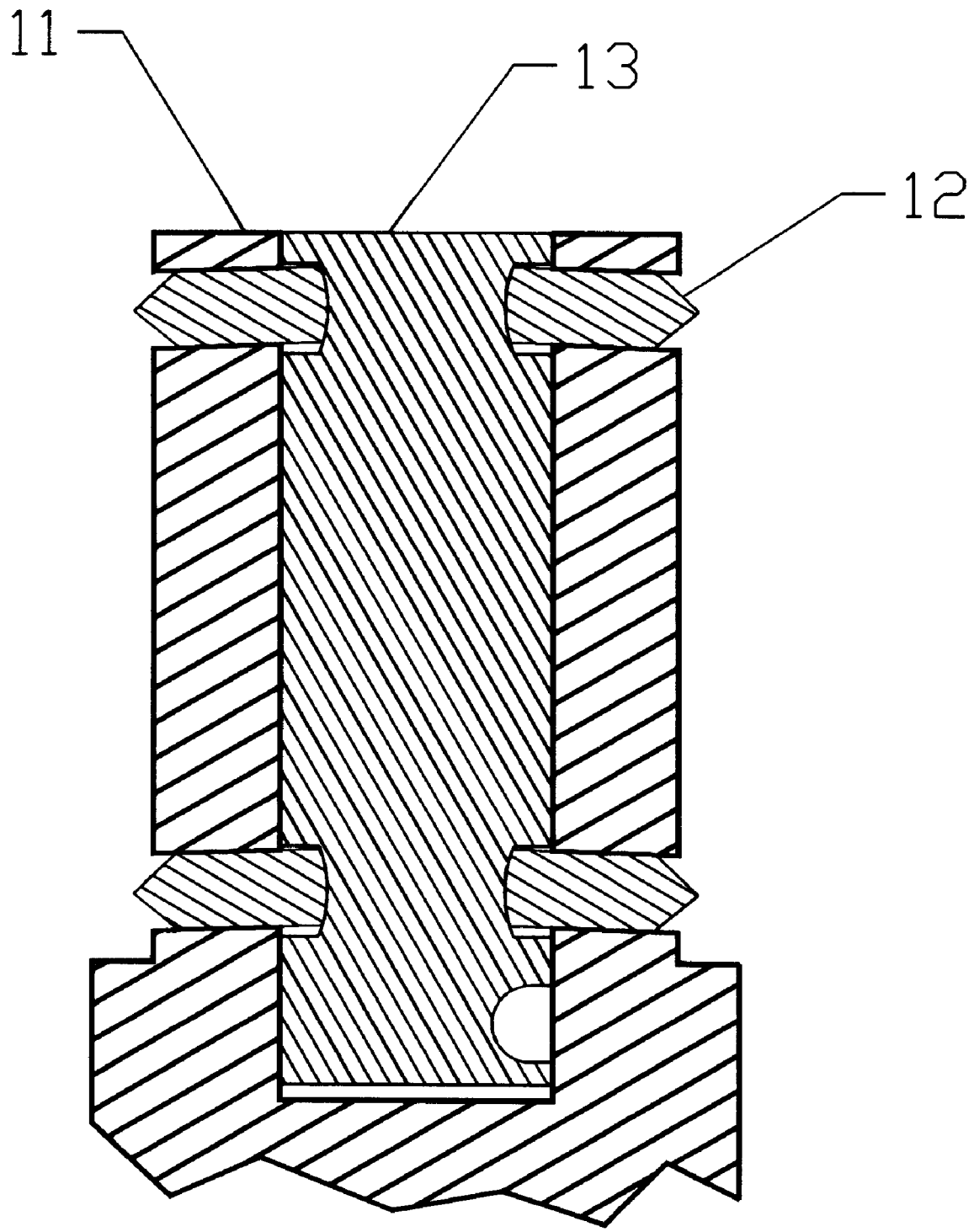
FIG. 8 shows a third embodiment.

FIG. 8 shows a third embodiment of the invention consisting of connector body 11, eight small pins 12, and central cam 13. The shape of the central cam is similar to that shown in FIG. 5.

Whereas, the preferred and other embodiments of the present invention have been described above, it is contemplated that other alternatives and modifications may become apparent to those skilled in the art after having read this disclosure. It is therefore intended that the appended claims be interpreted as covering all such alterations and modifications as fall within the true spirit and scope of the invention.

I claim:

1. A connector for joining standard commercial square or rectangular tubing comprising:

a central block having connection faces thereon, each of the connection faces having a projection extending perpendicular to the respective connection face, said projection having an adjacent section adapted to match exterior dimensions of the tubing to be connected thereto and a distal section adapted to fit inside the tubing, said projection having a central circular bore extending through said adjacent and distal sections and radial holes formed in the distal section extending from the central circular bore to corners of the distal section;

a rotatable cam disposed in the central circular bore of the projection and extending through the adjacent and distal sections;

at least one screw disposed in the adjacent section and in engagement with the rotatable cam for turning the rotatable cam; and slidable pins disposed in the distal section and extending outward through the radial holes upon the turning of the rotatable cam.

2. The connector of claim 1, wherein said at least one screw is arranged tangentially with respect to the rotatable cam for engaging teeth of the rotatable cam.

3. The connector of claim 1, wherein said at least one screw is arranged tangentially with respect to the rotatable cam for engaging inclined surfaces of the rotatable cam.

4. The connector of claim 1, wherein said at least one screw is arranged tangentially with respect to the rotatable cam for engaging notches of the rotatable cam.

5. The connector of claim 1, wherein said rotatable cam has a series of cam surfaces for sequentially engaging each of the slidable pins.

6. The connector of claim 1, wherein said rotatable cam has a single prismatic cam surface with four lobes for engaging each of the slidable pins.

7. The connector of claim 1, wherein said slidable pins consist of four slidable pins having sufficient length to provide angular restraint for the tubing.

8. The connector of claim 1, wherein said slidable pins consist of four slidable pins disposed proximal to the respective adjacent section and four slidable pins disposed distal to the adjacent section.

9. The connector of claim 1, wherein each of the slidable pins has a pointed portion for penetrating an interior surface of the tubing.

10. The connector of claim 1, wherein each of the slidable pins is disposed in a sloped slot so as to draw the tubing firmly against the connector as the pins are driven outward by the rotatable cam.

11. The connector of claim 1, wherein each of the slidable pins has a resilient element for preloading the slidable pin away from the central block and parallel to the tubing.

* * * * *